United States Patent [19]

Kappelsberger et al.

[11] 4,175,226
[45] Nov. 20, 1979

[54] SEALING DEVICE FOR CHARGED PARTICLE BEAM WELDING

[75] Inventors: Erwin Kappelsberger; Peter Anderl, both of Munich; Karl H. Steigerwald, Starnberg, all of Fed. Rep. of Germany

[73] Assignee: Steigerwald Strahltechnik GmbH, Munich, Fed. Rep. of Germany

[21] Appl. No.: 901,003

[22] Filed: Apr. 28, 1978

[30] Foreign Application Priority Data

May 11, 1977 [GB] United Kingdom .............. 19830/77

[51] Int. Cl.² ................................................ B23K 9/00
[52] U.S. Cl. ............................................. 219/121 EM
[58] Field of Search ................. 219/121 EB, 121 EM, 219/121 R, 69, 137, 121 P

[56] References Cited

U.S. PATENT DOCUMENTS

| | | | |
|---|---|---|---|
| 3,136,882 | 6/1964 | Radtke | 219/121 EM |
| 3,702,389 | 11/1972 | Peyrot | 219/121 EB |

*Primary Examiner*—J. V. Truhe
*Assistant Examiner*—Fred E. Bell
*Attorney, Agent, or Firm*—Brumbaugh, Graves, Donohue & Raymond

[57] ABSTRACT

In a method of welding with a beam of charged particles, outside of a mobile vacuum chamber a gap between two workpiece parts is sealed by an elongated metal foil strip, two marginal zones of which being sealingly cemented to surface portions of said workpiece parts, said marginal portions being sufficiently spaced from the gap to avoid excessive heating of the adhesive during welding a seam along said gap. The preferred material for the foil strip is copper or austenitic steel.

13 Claims, 3 Drawing Figures

SEALING DEVICE FOR CHARGED PARTICLE BEAM WELDING

This invention relates to welding with beams of charged particles, for example, electron beam welding.

If two workpieces are to be welded together with a charged particle beam welding machine having a vacuum chamber sealed against a surface of the workpieces to the joined and movable with respect to said surface (rather than encompassing the workpieces), there being a gap between the workpieces, it is essential to seal the portion of this gap in a vacuum-tight manner which is not covered by the vacuum chamber. The two workpieces may in fact be, for example, opposite side edges of a piece of sheet metal curved to form a cylinder.

U.S. Pat. No. 3,136,882 discloses a method of welding an elongated joint using an electron beam (E.B.) machine having a vacuum chamber or column which is fitted by a sealing shoe to the surfaces at an upper side of the workpieces to cover a portion of the gap including the area where the joint is welded. A local vacuum is produced in the column and air is prevented from entering into it by cementing a pressure sensitive tape over the portion of the gap not covered by the shoe on the side of the workpieces over which the E.B. column slides. The under side of the joint is sealed by a reusable metal channel bridging the joint. Pressure sensitive tapes are employed to seal the channel against the workpieces on both sides of the joint.

The pressure sensitive tape covering and sealing the gap is burned and destroyed by the electron beam in the course of welding the joint. The pressure sensitive tape, which is of a plastics material develops waste amounts of gas and vapours when burned by the electron beam, which makes the use of such a pressure sensitive tape unpractical, since the necessary vacuum cannot be maintained in the E.B. column under these circumstances.

According to the invention, in welding a gap with a beam of charged particles produced by a machine having a vacuum chamber movable with respect to the workpieces to be joined, a thin foil, sheet or tape of metal, preferably copper or austenic steel, is used to seal the joint. The metal tape or foil is cemented to the workpieces on both sides of the joint, preferably by a double-sided pressure-sensitive plastics or paper tape, the distance between the zone of the metal tape struck by the beam and the pressure sensitive tape or other cementing means being sufficient to avoid excessive heating of the cement or tape and development of objectionable amounts of gas and vapour.

The rear side of the gap can be sealed by a reusable channel as described in U.S. Pat. No. 3,136,882.

Alternatively, a small vacuum chamber, which is moved with the main column, and a sealing tape, similar as in the case of the side, on which the beam impinges, can be used also at the opposite or beam exit side.

An electron beam machine having a mobile vacuum chamber with the electron-beam gun is used, the mobile chamber being moved over this metal foil during the welding process. At the impact spot of the electron beam (welding spot), the metal foil is destroyed by the electron beam, and it does not influence the actual welding process.

When the metal foil has passed the welding spot, its residue usually comes out of the mobile vacuum chamber to the open atmosphere, through the sealing system of the vacuum chamber. The selection of the foil material is therefore affected in accordance with the following criteria:

1. The foil material should not bond the melting charge of the welding puddle and bead during the welding.
2. The foil material must melt or vaporize at the point of impact of the beam so that a free space of about 5 to 10 mm results between the melted-on base or workpiece material and the foil. (On this condition, the various beam/gap position measurements can be carried out as if the gap were not covered with a foil).
3. The foil material should not be distorted in the region of the remaining foil residue under the thermal effect of the beam, in order to maintain the sealing function in the exit region of the mobile vacuum chamber.
4. The foil material must melt or vaporize so that the melted edges are smooth and homogeneous that the sealing function is maintained in the region of the exit point of the mobile vacuum chamber.
5. The foil must have a minimum width such that the adhesive strip or cement at both sides does not evolve gas, as a result of the thermal loading, to such an extent that the vacuum can no longer be maintained or an objectionable pollution occurs in the vacuum chamber.
6. The foil material must be so flexible that it fits snugly against edge displacements which, in practice may amount to e.g. about 2 mm at the abutment point of the workpieces to be welded so that the sealing function is maintained in the entry of the mobile vacuum chamber.
7. The foil material must have such a strength that it is not pulled into the gap during the evacuation of the gap between the workpieces.

Copper foil is preferred since it is melted by the electron beam and recedes upon melting such that it does not interfere and alloy with the weld proper. The copper tape must be wide enough to prevent over heating and, thus, excessive gassing of the pressure-sensitive tapes by which the sides of the copper tape are sealed to the pieces to be joint. A width of at least 100 mm yields satisfactory results.

The copper foil may have the thickness of about 0.1 mm. A copper foil of this thickness is flexible enough to allow for minor offsets of the workpieces at the joint, it does not warp when heated and molten by the electron beam and it is sufficient stiff to avoid being sucked into the gap of the joint. The molten margins are fairly smooth and homogeneous so that the vacuum seal is not impaired at the area, where the sealing shoe of the electron beam machine column slides over the welded joint with the remnants of the foil on both sides of it.

Similar results are obtained with a foil of austenitic steel having a width of between about 70 to 200 mm.

The width of the stripe of cement or of the pressure sensitive tape at both margins of the metal foil may be about 15 to 25 mm.

The invention may be better understood with reference to the accompanying drawing wherein like reference numbers refer to like elements in the different Figures, and in which.

Figure 1:
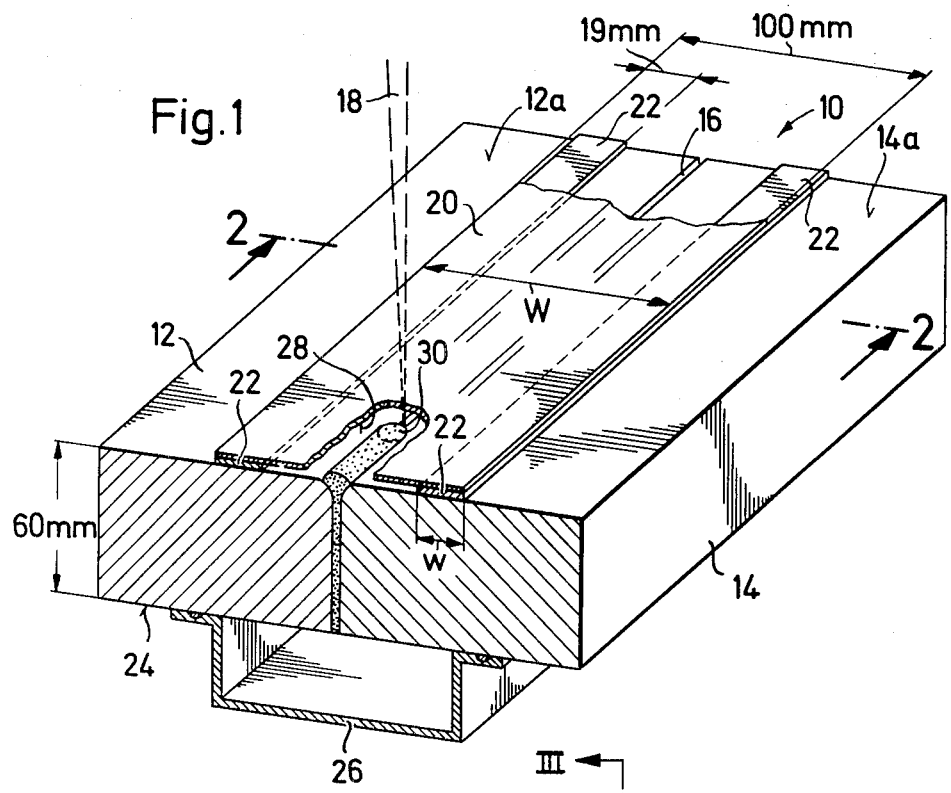
FIG. 1 is a perspectivic view of two plate-shaped workpieces to be joined by electron beam welding and forming a gap which is sealed by a metal tape according to an embodiment of the invention.
Figure 2:
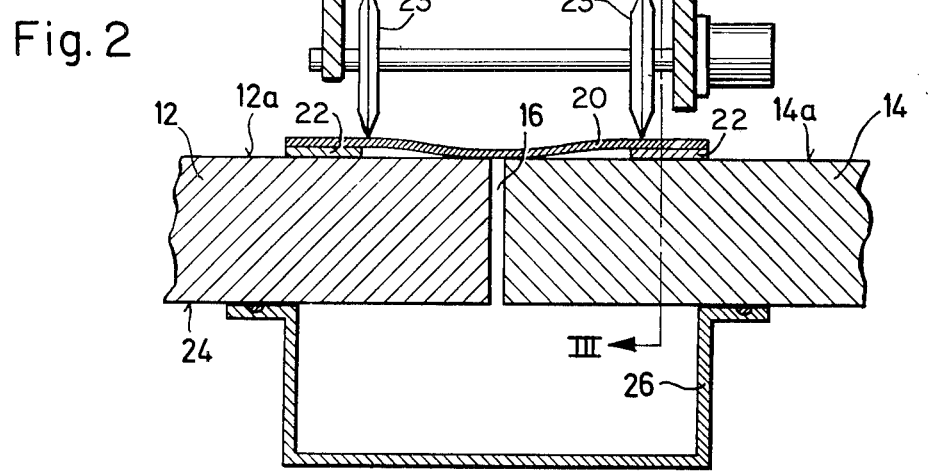
FIG. 2 is a section view along line 2—2 in FIG. 1.
Figure 3:
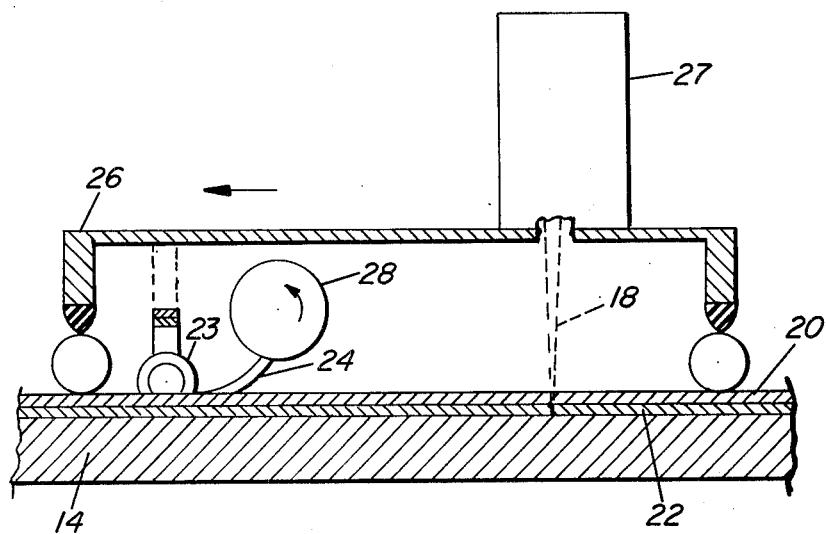
FIG. 3 is a section view of a welding apparatus in accordance with the present invention.

A workpiece arrangement 10 is shown in FIG. 1 which consists of two metal plates 12 and 14 which are to be joined by welding with a E.B. welding machine which may be of known type, e.g. as shown in U.S. Pat. No. 3,136,882. The E.B. welding machine has a shoe which seals against and slides over surfaces 12a and 14a of the metal plates 12 and 14, respectively. The workpieces define a gap 16 which is closed by an electron beam 18 in the course of the welding operation. The gap is sealed by a seal which consists of a strip of metal foil, which is cemented and sealed by double sided pressure-sensitive tapes 22 to surfaces 12a and 14a respectively. At a lower or beam exit side 24 of the workpiece arrangement 10, the gap is sealed by a reusable metal channel member 26 having sealing flanges or, alternatively, being sealed by pressure sensitive tapes as disclosed in the above-mentioned United States patent.

Copper and austenitic steel are the preferred materials for the metal foil since these materials recede and form a relatively smooth edge upon melting by the electron beam 18 such that the residue does not interfer and alloy with the weld 30 proper and can be accommodated by the vacuum seal of the sealing shoe of the E.B. machine. A preferred range of thickness of the foil is between 0.05 and 0.5 mm, a thickness of about 0.1 mm will give satisfactory results in most cases. The width W of the metal foil strip 20 and the width w of the sealing cement strip or pressure sensitive tape 22 is chosen such that excessive heating of the cement or pressure sensitive tapes 22 is avoided during the welded process. Foil width W of at least 100 mm and sealing cement stripe or pressure sensitive tape width w of 10 to 25 mm give satisfactory results, the relative position of the sealing tapes 22 in respect to the metal foil strip 20 being such that the distance between the zone of the metal foil melted by the beam, and the nearest margin of the sealing strip or tape being as large as possible, preferably at least about 25 mm or more.

Larger width W, e.g. up to 200 mm and more can of course be used if desired. In some cases, e.g. if materials of low thermal conductivity are used, as stainless or austenitic steel, metal foil width W as low as 70 mm may be successfully employed.

Various adhesives or cements, e.g. epoxy resins, and various pressure sensitive tapes, which are preferably fiber-reinforced paper or plastic tapes, can be used for sealing the margins of the metal foil to the surfaces of the workpiece arrangement. The cement and pressure sensitive tapes used should not evolve excessive amounts of gases and vapors when subjected to the vacuum under the sealing shoe of the electron beam welding machine.

A hole may be punched in metal foil tape 20 prior to positioning the sealing shoe of the E.B. welding machine thereon to allow for evacuation of the gap 16 by the vacuum system of the welding machine before the welding operation starts.

The metal foil tape 20 or its residue may be taken up within the shoe or column of the E.B. machine to alleviate the sealing problems at the point where the weld seam emerges from the shoe. A cutting device, e.g. two cutting wheels 23 maybe provided inside the shoe to cut out a middle portion 24 of the metal foil tape 20 within the sealing shoe 26 before this portion arrives at the beam 18 generated by electron gun 27. The cutout middle portion 24 or the entire foil tape with or without any adhesive tapes maybe taken up inside the shoe by an appropriately positioned and driven take up reel 28.

While preferred embodiments of the invention have been shown and disclosed, ist is to be understood that the invention has been described by way of illustration rather than limitation and accordingly it is to be limited only by the appended claims taken in view of the prior art.

We claim:
1. A method of electron beam welding a gap or joint (16) between workpiece parts, each of which having an edge defining said joint and a surface extending from the edge;
    said method comprising:
    placing a longitudinal strip of metal foil over said joint and providing a vacuum-tight seal between said strip and said workpiece surfaces;
    sealing the side of the joint opposed to said surfaces;
    placing a movable vacuum chamber on, and sealing it with respect to said surfaces, said vacuum chamber comprising an electron gun for producing an electron beam for welding said joint;
    evacuating said chamber and directing said beam onto and moving said chamber along said joint to form a weld seam;
    the improvement consisting in the additional step of severing a portion of said metal foil strip between the edges thereof within said vacuum chamber and lifting said portion from said workpiece surfaces.
2. The method as claimed in claim 1 wherein said foil strip comprises copper.
3. The method as claimed in claim 1 wherein the foil strip comprises austenitic steel.
4. The method as claimed in claim 1 wherein the foil has a thickness between about 0.05 mm and about 0.5 mm.
5. The method as claimed in claim 1 wherein the foil has a thickness of about 0.1 mm.
6. The method as claimed in claim 1 wherein the foil strip has a width of at least 70 mm.
7. The method as claimed in claim 1 wherein the foil strip has a width of at least 100 mm.
8. The method as claimed in claim 1 wherein each of the marginal zones of said strip are connected to said workpiece surfaces by a strip double-sided pressure sensitive tape.
9. The method as claimed in claim 1 wherein said beam is an electron beam.
10. The method as claimed in claim 1 wherein said portion of said metal foil strip is cut out by cutting wheels.
11. The method as claimed in claim 1 or 10 wherein said cut portion is taken up on a take-up reel within said vacuum chamber.
12. An apparatus for electron beam welding, comprising
    a vacuum chamber having an opening provided with means to seal said opening against a workpiece surface, said means permitting a relative movement of said chamber with respect to said surface;
    an electron gun mounted within said chamber and adapted to direct an electron beam through said opening to said workpiece; and
    cutting means mounted in said chamber such that a longitudinal portion of a sealing foil strip attached to said workpiece surface is cut out of said strip while said chamber is moved in respect to said surface along said strip.
13. The apparatus as claimed in claim 12 characterized by take-up means mounted within said vacuum chamber to take up said removed portion of said strip.

* * * * *